US008401244B2

(12) United States Patent
Vogler et al.

(10) Patent No.: US 8,401,244 B2
(45) Date of Patent: Mar. 19, 2013

(54) METHOD AND SYSTEM FOR SECURELY AUTHENTICATING USER IDENTITY INFORMATION

(75) Inventors: Dean H. Vogler, Algonquin, IL (US); Douglas A. Kuhlman, Inverness, IL (US); Yi Q. Li, Skokie, IL (US)

(73) Assignee: General Instrument Corporation, Horsham, PA (US)

( * ) Notice: Subject to any disclaimer, the term of this patent is extended or adjusted under 35 U.S.C. 154(b) by 1277 days.

(21) Appl. No.: 11/962,934

(22) Filed: Dec. 21, 2007

(65) Prior Publication Data

US 2009/0161919 A1 Jun. 25, 2009

(51) Int. Cl.
*G06K 9/00* (2006.01)
*G06K 9/46* (2006.01)
*G06K 9/64* (2006.01)

(52) U.S. Cl. ........ 382/115; 382/195; 382/217; 382/218; 340/5.84

(58) Field of Classification Search .................. 382/100, 382/115, 124, 195, 209, 217, 218; 340/5.52, 340/5.82, 5.84; 704/246; 713/186
See application file for complete search history.

(56) References Cited

U.S. PATENT DOCUMENTS

| | | | | |
|---|---|---|---|---|
| 4,532,508 A * | 7/1985 | Ruell | | 340/5.83 |
| 4,805,222 A * | 2/1989 | Young et al. | | 382/115 |
| 4,962,530 A * | 10/1990 | Cairns | | 713/183 |
| 4,998,279 A * | 3/1991 | Weiss | | 340/5.52 |
| 5,056,141 A * | 10/1991 | Dyke | | 340/5.27 |
| 5,479,533 A * | 12/1995 | Tanaka | | 382/161 |
| 5,485,312 A * | 1/1996 | Horner et al. | | 359/561 |
| 5,557,686 A * | 9/1996 | Brown et al. | | 382/115 |
| 5,729,608 A * | 3/1998 | Janson et al. | | 713/171 |
| 6,741,729 B2 * | 5/2004 | Bjorn et al. | | 382/124 |
| 6,895,514 B1 * | 5/2005 | Kermani | | 726/19 |
| 6,948,074 B1 * | 9/2005 | Borella et al. | | 726/14 |
| 7,021,534 B1 * | 4/2006 | Kiliccote | | 235/380 |
| 7,178,034 B2 * | 2/2007 | Cihula et al. | | 713/186 |
| 7,454,623 B2 * | 11/2008 | Hardt | | 713/182 |
| 7,460,130 B2 * | 12/2008 | Salganicoff | | 345/590 |
| 2004/0187037 A1 * | 9/2004 | Checco | | 713/202 |
| 2004/0190781 A1 * | 9/2004 | Shiibashi et al. | | 382/210 |
| 2006/0067592 A1 * | 3/2006 | Walmsley et al. | | 382/303 |
| 2006/0136725 A1 * | 6/2006 | Walmsley | | 713/171 |
| 2006/0226951 A1 * | 10/2006 | Aull et al. | | 340/5.61 |
| 2007/0011464 A1 * | 1/2007 | Gorelik et al. | | 713/186 |
| 2007/0026426 A1 * | 2/2007 | Fuernkranz et al. | | 435/6 |
| 2007/0160198 A1 * | 7/2007 | Orsini et al. | | 380/28 |
| 2007/0198848 A1 * | 8/2007 | Bjorn | | 713/186 |
| 2008/0005785 A1 * | 1/2008 | Leinonen et al. | | 726/3 |
| 2008/0019573 A1 * | 1/2008 | Baltatu et al. | | 382/115 |
| 2008/0049939 A1 * | 2/2008 | Canetti et al. | | 380/277 |
| 2009/0161919 A1 * | 6/2009 | Vogler et al. | | 382/115 |
| 2009/0205028 A1 * | 8/2009 | Smeets et al. | | 726/6 |
| 2009/0271634 A1 * | 10/2009 | Boult et al. | | 713/186 |

OTHER PUBLICATIONS

Merriam Webster Definition of "Nonce" pp. 1-2.*
Merriam Webster definition "Interrogate" p. 1-2.*
Written Opinion for US/PCT 2008_087088 pp. 1-9.*
Merriam Webster Defintiion of "Cryptographic Nonce" pp. 1-3.*
Li et al. "Protecting RFID Communications in Supply Chains" ASIASCCS Mar. 20-22, 2007 pp. 1-8.*

(Continued)

*Primary Examiner* — David P. Zarka
*Assistant Examiner* — Mia M Thomas
(74) *Attorney, Agent, or Firm* — Susan R. Payne

(57) ABSTRACT

Systems and methods for providing secure identity authentication amongst devices using identity information contained therein to facilitate data synchronization amongst the user devices, wherein the identity information in the devices are compared for authentication but not actually transmitted or exposed for unauthorized access to such information and to the devices.

10 Claims, 12 Drawing Sheets

OTHER PUBLICATIONS

Meszaros et al. "Strengthening Passwords by Keystroke Dynamics" IEEE International Workshop on Intelligent Data Acquisition and Advanced Computing Systems Sep. 6-8, 2007, pp. 1-4.*

PCT International Search Report; Re: PCT Application #PCT/US08/87088 Dec. 17, 2008.

Office Action, Korean App. No. 10-2010-7013567 (Foreign Text and English Translation), Aug. 31, 2011.

A. Menezes, et al, "Handbook of Applied Cryptography, Chapter 10 Identification and Entity Authentication", CRC Press, 1997.

* cited by examiner

METHOD AND SYSTEM FOR SECURELY AUTHENTICATING USER IDENTITY INFORMATION

BACKGROUND

In our modern electronics driven world, a user of an electronics device typically has many such devices. For example, a user may own a set of devices, such as a cellphone (perhaps multiple), a PDA (personal data assistant), computers, and set-top boxes. Each device may be capable of being loaded with personal data such as contacts information, calendar schedules, and other data files. However, loading the same personal data in each of the user's devices, as the user often desires for data synchronization, can be burdensome to the user. Furthermore, if an update to the personal data is made to one device, the same update would need to be manually duplicated in the other devices to provide seamless service across all of the user's devices.

There exist methods and apparatuses that enable automatic synchronization of data across multiple electronic devices to avoid the need for the aforementioned burdensome manual synchronization. To facilitate properly-targeted automatic synchronization of personal data, each of the user's devices may be provisioned or loaded with identity information to ensure that the user's personal data is synchronized only with other the devices of the same user. For example, all devices of a single user may be loaded with identity information such as traditional crypto keys, PINs (personal identification numbers), passwords, biometric information and other authentication information such as mother's maiden name, place of birth, pet's name, etc. Once the user's devices are provisioned or loaded with the user's identity information, the user may use such information for authentication to access the devices and manually synchronize the user's personal data therein. Thus, there is a desire by the user to have the user's devices performing automatic authentication with one another so that the user's data may be automatically synchronized among the user's devices. However, of concern is the manner in which the user's devices must transmit and expose the user's identity information to other devices in order to perform an automatic device authentication. Clearly, there is a desire to provide secure identity authentication in the user devices for detection of those devices that belong to a single user so that the user's identity information therein may be used to facilitate synchronization of data across the user's devices. Furthermore, such identity information should be kept private or secure so as not to be exposed to unauthorized devices or users that may use such information to steal or otherwise retrieve data from the user's devices. Thus, as referred herein, identity authentication of a device involves the identification of a device or its user based on identity information contained therein for the purpose of authorizing the device to perform one or more functions, such as data synchronization with another device. Proper identity authentication is important to the future of seamless mobility because it is a crucial element for secure communications between devices.

SUMMARY

In one embodiment, there is provided a method of authenticating a user's identity, comprising: sending an interrogating nonce; receiving a first masked template of a first identity-related template based on the interrogating nonce; and determining whether the first identity-related template matches a second identity-related template using the received first masked template of the first identity-related template, the second identity-related template, and the interrogating nonce.

In another embodiment, there is provided a method of proving a user's identity, comprising: receiving an interrogating nonce; generating a first masked template of a first identity-related template based on the interrogating nonce; and sending the first masked template based on the interrogating nonce.

In still another embodiment, there is provided a system for authenticating a user's identity across a plurality of user devices comprising a first one of the plurality of user devices operating as an interrogating device that includes: a first nonce generator that operates to generate an interrogating nonce; a first communication interface that is electrically coupled to the first nonce generator to send out the interrogating nonce generated by the first nonce generator and to receive a first masked template of a first identity template based on the interrogating nonce; and a first comparator that is electrically coupled to the first communication interface and the first nonce generator to determine whether the first identity-related template matches a second identity-related template of the interrogating device using the received first masked template provided by the first communication interface, the second identity-related template of the interrogating device, and the interrogating nonce provided by the first nonce generator.

BRIEF DESCRIPTION OF DRAWINGS

Embodiments are illustrated by way of example and not limited in the following figure(s), in which like numerals indicate like elements, in which.

DETAILED DESCRIPTION

Figure 1:
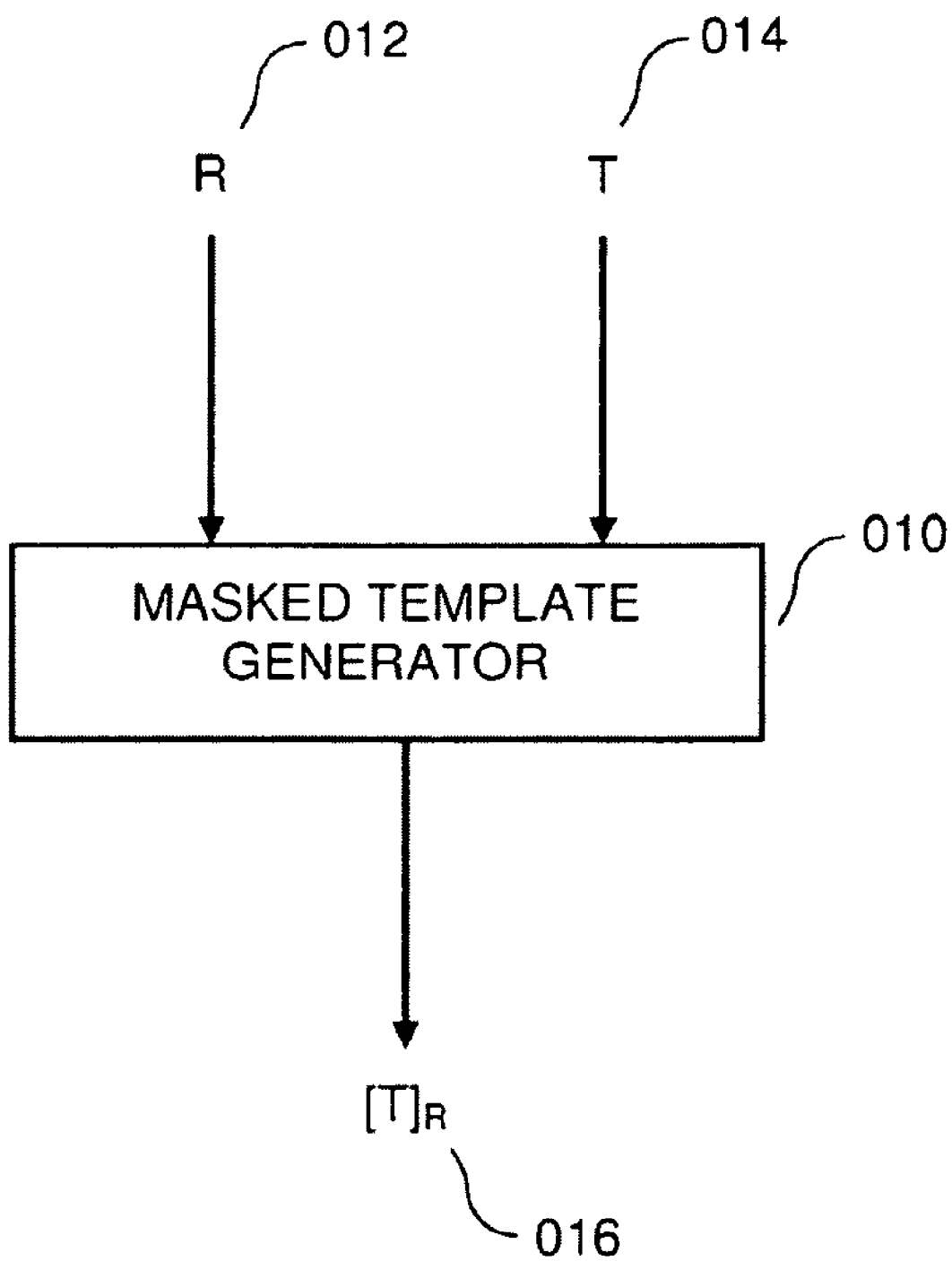
FIG. 1 illustrates a block diagram of a masked template generator for generating a masked template according to an embodiment.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Although PIN and password are commonly used as identity information in most authentication schemes, biometric authentication mechanisms are being increasingly offered as an alternative because they are considered more secure. Accordingly, embodiments discussed herein allow multiple user electronics devices to securely determine the identity information of each other by securely sharing biometric templates (or any other identity-related templates) that are very close to being the same, but not necessarily identical, due to practical limitations in deriving biometric templates from two separate instances of a biometric scan. These embodiments simplify the user involvement of comparing the user's identity information across devices. Given a collection of user devices, such devices are operable to securely discover amongst themselves whether they share a common user. If they do, they are further operable to form a connection or communication and exchange data therein. Thus, for example, two devices that share identical or sufficiently similar biometric templates may securely communicate with each other. On the other hand, two devices that do not share an identical or sufficiently similar template, learn nothing about the other device's template.

The biometric template is the data derived from a biometric scan of the user. Biometric scans include, but are not limited to, fingerprints, eye scans (e.g., iris scans), palm prints and voice prints. The user may implement a biometric template, developed from a biometric scan of the user, in each of the user's devices to serve as identity information. Each biometric scan of a single exemplar, for example a thumbprint, is not identical to the scan before it of the same exemplar of the same user. However, two biometric scans of the same exemplar of the same user are sufficiently close that the two templates developed for two different devices are sufficiently similar for use to establish a secure authenticated channel (SAC) for communications between the devices, using one or more of the embodiments described herein.

According to various embodiments described herein, when two devices communicate to determine each other's identity information, the information visible to a third party that passively or actively listens in on the information exchange is insufficient to determine either device's identity information. That is, the intercepted communication does not provide enough additional information for the third party to reconstruct biometric templates by detection or by brute-force calculations. These embodiments may be used in any setting where user-based identity information is used for security or authentication purposes. For example, these embodiments apply to many seamless mobility applications. The goal is to allow two devices to automatically discover they share a common user. With that knowledge, they can then synchronize their data in a secure manner, and their privacy integrity cannot be undermined by attackers.

In order to protect a user's identity information, such as the user's biometric template, that is maintained in a user's device, it is not prudent to send a biometric template from one device to another, otherwise any attacking device may acquire the user's template and attempt to steal the user's data through synchronization with the user's device. In one embodiment, two devices are operable to determine whether the peer device contains a common biometric template without revealing their raw templates to each other firsthand. Thus, devices will never reveal the raw biometric template to the outside world. Instead, the device may calculate a processed version of the template, hereby called a masked template. There are several methods that may be used for this calculation. One such method utilizes fuzzy extractor functions that are described by Dodis, Ostrovsky, Reyzin, and Smith in "Fuzzy Extractors: How to Generate Strong Keys from Biometrics and Other Noisy Data," Sep. 20, 2007, found online. Preliminary version appeared in Eurocrypt 2004 [DRS04].

Accordingly, user devices may send masked templates in the clear, and an attacker is not able to derive the original biometric template because the calculation used in deriving a masked template is one-way (like a cryptographic hash). The local device receiving a masked template from a remote device may use a comparator algorithm, which takes as input its own raw biometric template, its locally generated nonce, and the masked template of the remote device based on its locally generated nonce. Cryptographically, a nonce is a number or bit string that is used only once. Examples of nonces include, but are not limited to, counts, random numbers, and pseudo-random numbers. The outcome of the comparator algorithm of the local device is a decision whether enough matching bits have been received from the remote device to declare that the raw biometric templates match. Similarly, the outcome of the comparator algorithm of the remote device is a decision whether enough matching bits have been received from the local device to declare that the templates match. If both devices come to that conclusion, then the two devices may start to synchronize their data.

Embodiments use three processes, devices, and/or entities. For example, the processes may be implemented as algorithms for execution by a processor in a user device. The first process is a masked template generation utilizing a masked template generator 010 shown in FIG. 1. It takes as input a template T 014 and a nonce. As depicted, the nonce is a random number R 012. Thus, two different templates or two similar templates with different random inputs will produce very different outputs. In one embodiment, the masked template generator 010 comprises a one-way function, such as a fuzzy extractor function described by Dodis, Ostrovsky, Reyzin, and Smith in "Fuzzy Extractors: How to Generate Strong Keys from Biometrics and Other Noisy Data," Sep. 20, 2007, found online at http://eprint.iacr.org/2003/235.pdf, which is herein incorporated by reference in its entirety. Alternative embodiments are contemplated wherein other known one-way functions may be employed by the masked template generator 010. The process's output is a randomized masked template $[T]_R$ 016, which may be computationally intractable to reverse.

Figure 2:
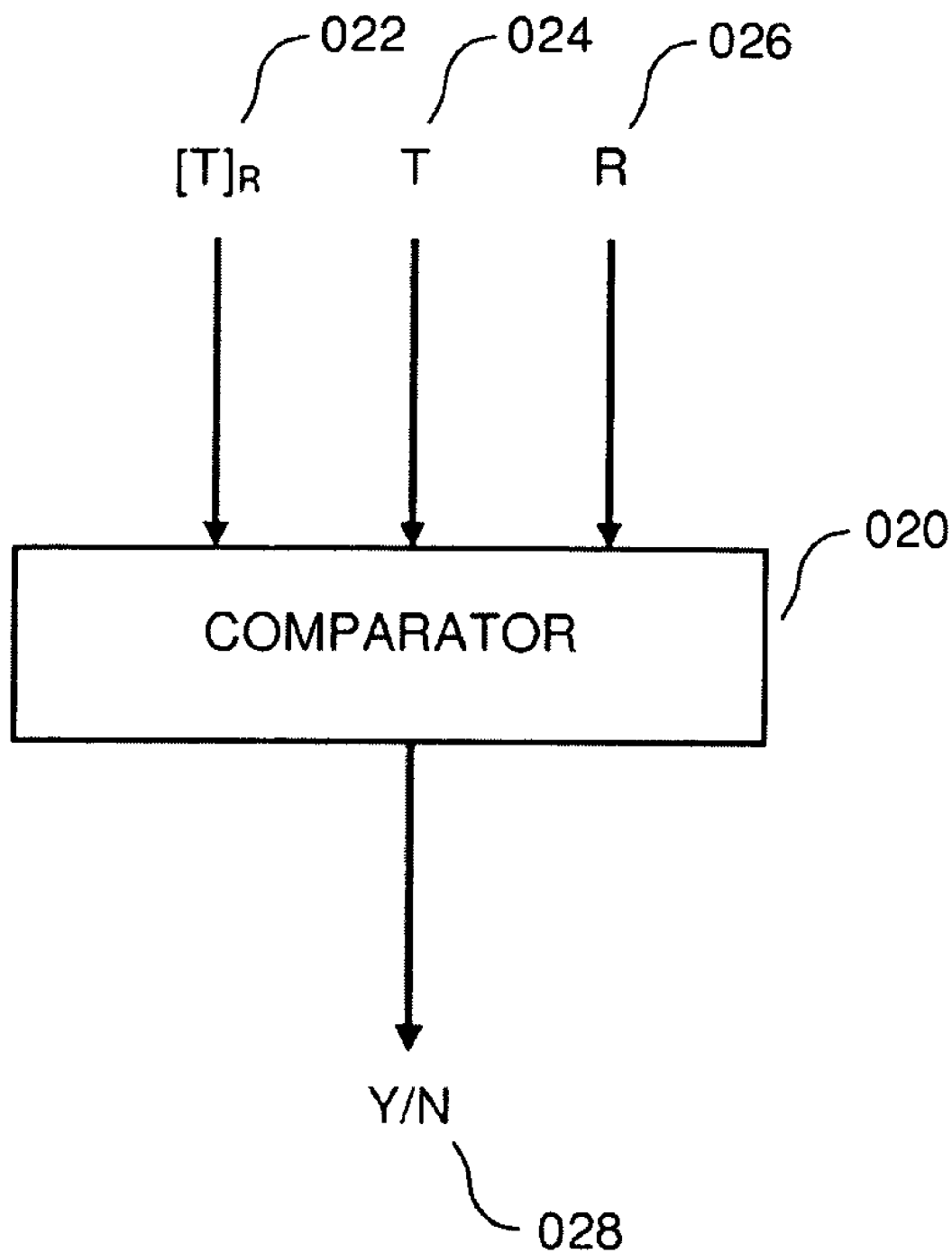
FIG. 2 illustrates a block diagram of a comparator for comparing templates according to an embodiment.

The second process is a comparison utilizing a comparator 020 shown in FIG. 2. The comparator takes three inputs, a raw template T 024, a masked template $[T]_R$ 022, and a nonce depicted as a random number R 026, and outputs a Yes/No (Y/N) decision 028. In one embodiment, the raw template T 024 is processed with random number R 026 to produce what will be referred to as a secondary masked template. If the randomized masked template $[T]_R$ 022 that is input to comparator 020 is sufficiently close to the secondary masked template, a "Yes" answer is output. To achieve a "Yes" answer, the randomized masked template 022 that is input to comparator 020 need not be identical to the secondary masked template. Alterative embodiments are contemplated wherein the randomized masked template 022 and the secondary masked template are generated with fuzzy extractor functions, and the two templates must be identical in order for comparator 020 to output "Yes". If the randomized masked template 022 is not close, then a "No" answer is output.

Figure 3:
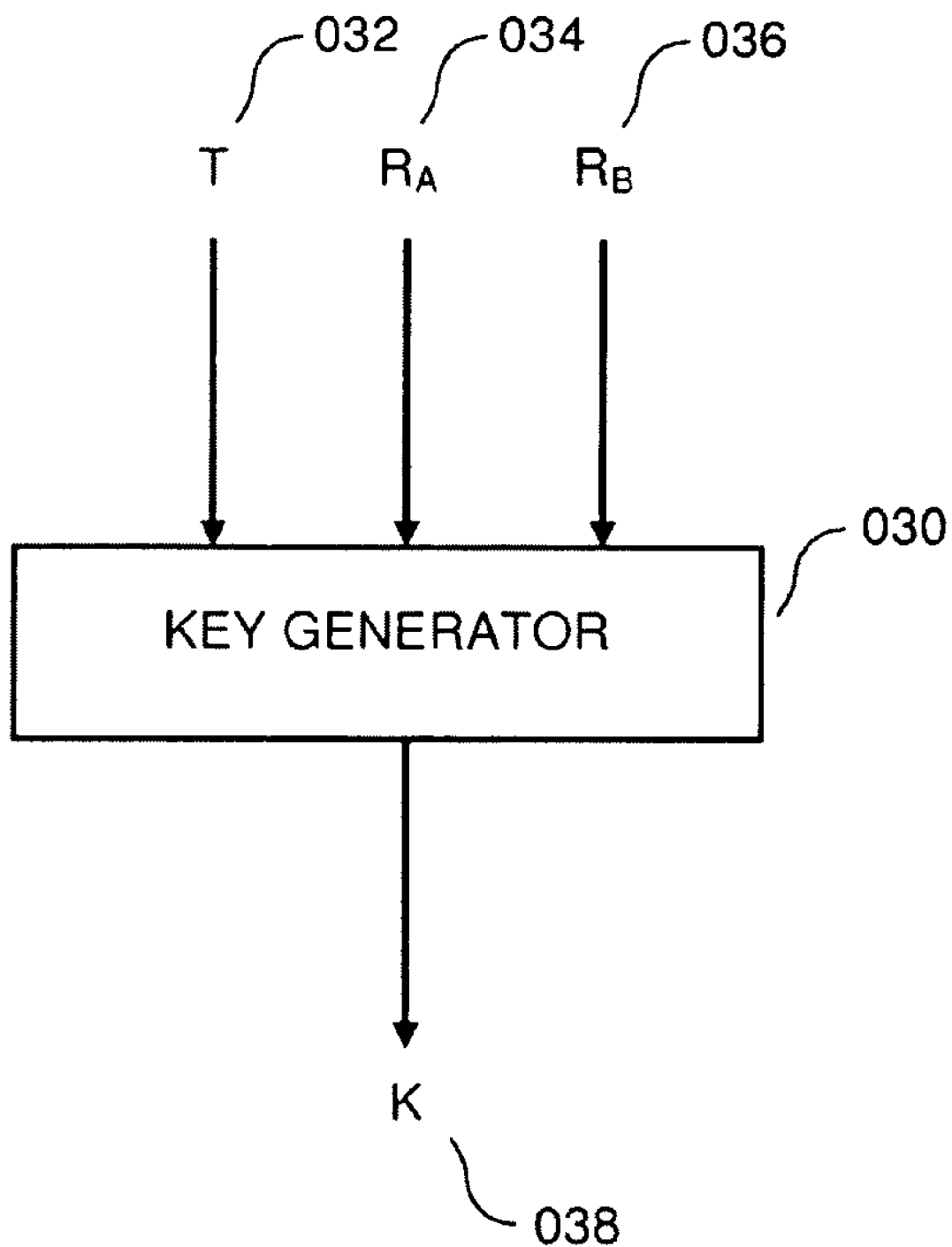
FIG. 3 illustrates a block diagram of a key generator for generating a key for secure communication according to an embodiment.

The third process is a key generation utilizing a key generator 030 shown in FIG. 3. The key generator takes three inputs, a raw template T 032, a first nonce $R_A$ 034 and a second nonce $R_B$ 036, and outputs key bits K 038. As depicted, the nonces $R_A$ 034 and $R_B$ 036 are random numbers. The bits K 038 can be generated in multiple ways. In one embodiment, these bits are simply the bits of the template 032 (generally high-order bits) which must match in order for the comparator 020 to match. In another embodiment, the nonces $R_A$ 034 and $R_B$ 036 are also used, alternatively or in combination, in the generation of K 038. This limits the efficacy of repeated data interception attacks. For example, the bits K 038 may be the output of a function G, i.e., G (T, $R_A$, $R_B$)=K, in which the random nonces $R_A$ 034 and $R_B$ 036 may be processed using a function F, i.e., F ($R_A$, $R_B$)=$R_C$, to first produce an output $R_C$. In the function F, the inputs $R_A$ 034 and $R_B$ 036, or any subset thereof, may be used to derive $R_C$. In one embodiment, both $R_A$ and $R_B$ are used in F, which may, for instance, be a hash function of $R_A$ 034 concatenated with $R_B$ 036 (i.e., F($R_A$, $R_B$)=SHA-2($R_A$∥$R_B$), where SHA-2 represents one in the family of hashing algorithms beyond SHA-1), a XOR function of $R_A$ 034 and $R_B$ 036, an encryption of $R_B$ 036 using $R_A$ 034 as the key, and the like. $R_C$ may then be input into a masked template generator, such as the masked template generator 010 of FIG. 1, along with the raw template T 032, to produce output K 038 of the function G. Other embodiments of the key generator based on $R_A$ 034 and/or $R_B$ 036 may be known to those of ordinary skill in the art and employed here as well.

Knowledge of the masked template generator, comparator, and key generator functions is considered public, as security relies solely on the secrecy of the raw biometric template T and the properties of the nonces $R_A$ and $R_B$.

There are two common attack scenarios which need to be mitigated. The first attack scenario is the replay attack. The problem to be mitigated in the first scenario is that an attacker might listen to communications between devices and receive a device's masked template that the attacker saves for later replay. Then later, the attacker sends the saved masked template back to the same device as if it were the attacker's masked template. Because the replayed masked template is identical to the masked template output by the device, the device will of course declare that the masked template matches its own.

In order to mitigate consequences of this first attack scenario, each masked template is generated with a statistically unique nonce value R as discussed above before transmitting. The nonce value R is generated such that all previously saved copies of its masked template will not be accepted.

Figure 4:
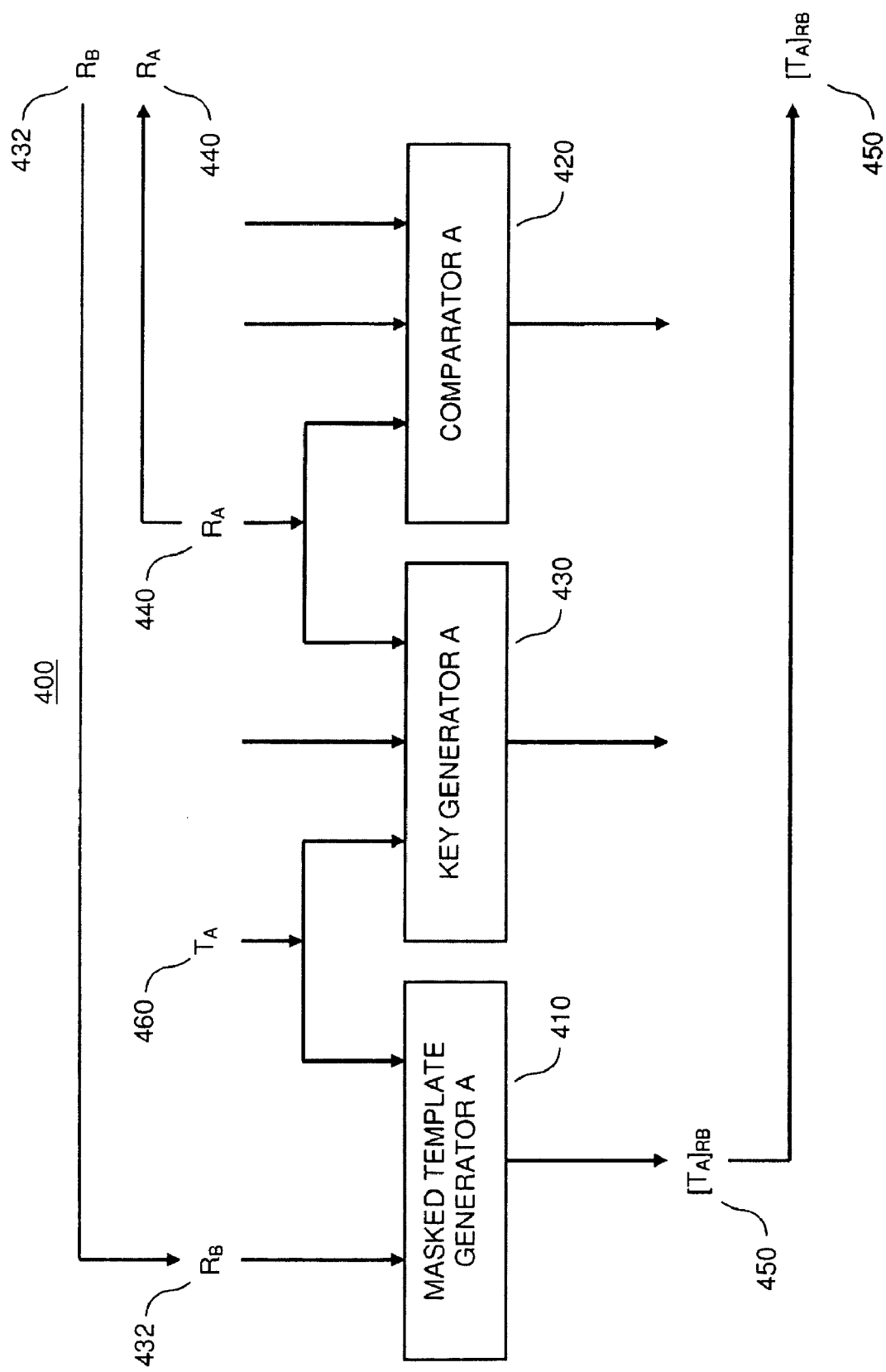
FIG. 4 illustrates a block diagram of a masked template generator, a comparator, and a key generator in a responding device in initial processing steps for secure identity authentication according to an embodiment.

For example, Device B generates and sends a random nonce $R_B$ to Device A. As shown in FIG. 4, Device A (depicted as 400) includes a masked template generator 410, a comparator 420, and a key generator 430. It receives the random nonce $R_B$ 432 (from Device B) at its masked template generator 410. In response, the masked template generator 410 of Device A generates a randomized masked template, denoted $[T_A]_{RB}$ 450, of its raw template $T_A$ 460 based on Device B's random nonce $R_B$ 432. Next, the Device A generates and sends a random nonce $R_A$ 440 along with the randomized masked template $[T_A]_{RB}$ 450 to Device B.

Figure 5:
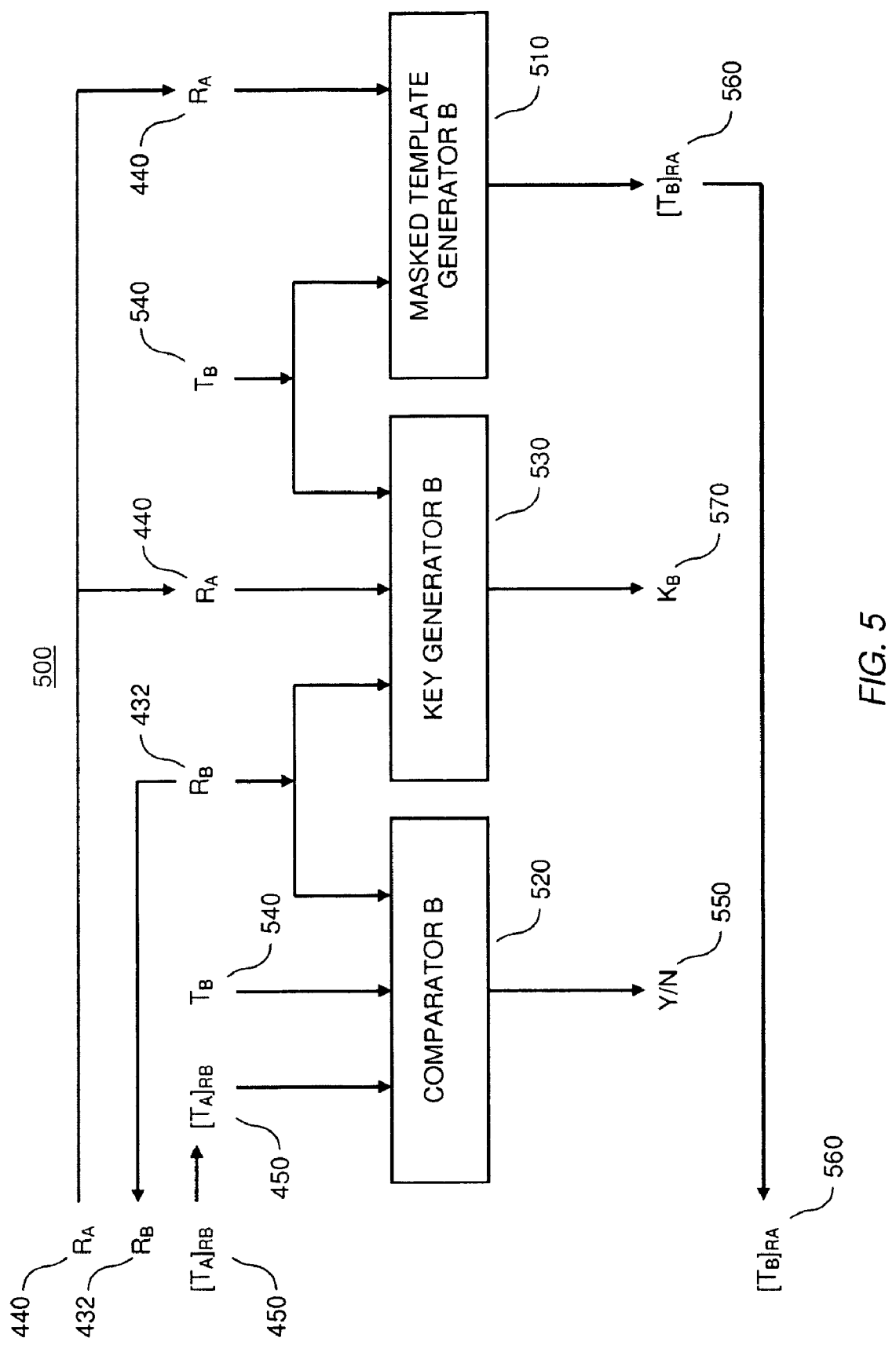
FIG. 5 illustrates a block diagram of a masked template generator, a comparator, and a key generator in an interrogating device in initial processing steps for secure identity authentication according to an embodiment.

As shown in FIG. 5, Device B (depicted as 500) includes a masked template generator 510, a comparator 520, and a key generator 530. After generating and sending a random nonce $R_B$ 432 to Device A, Device B receives the random nonce $R_A$ 440 (from Device A) at its masked template generator 510 and the randomized masked template $[T_A]_{RB}$ 450 (from Device A) at its comparator 520. Then, the comparator 520 of Device B processes its own raw template $T_B$ 540, its own random nonce $R_B$ 432, and the received masked template $[T_A]_{RB}$ 450 to produce a Yes/No decision 550 as described above with reference to FIG. 2. If the decision is a "No", Device B may choose to abort its synchronization operation with Device A. In this case, Device B does not accept the authentication information provided by Device A.

With continuing reference to FIG. 5, the masked template generator 510 of Device B generates a randomized masked template, denoted $[T_B]_{RA}$ 560, of its raw template $T_B$ 540 based on the random nonce $R_A$ 440 received from Device A. Then, Device B sends the randomized masked $[T_B]_{RA}$ 560 to Device A. Furthermore, as shown in FIG. 5, the key generator 530 of Device B processes the received random nonce $R_A$ 440, its own random nonce $R_B$ 432, and its own raw template $T_B$ 540 to produce its key bits $K_B$ 570 as described above with reference to FIG. 3.

Figure 6:
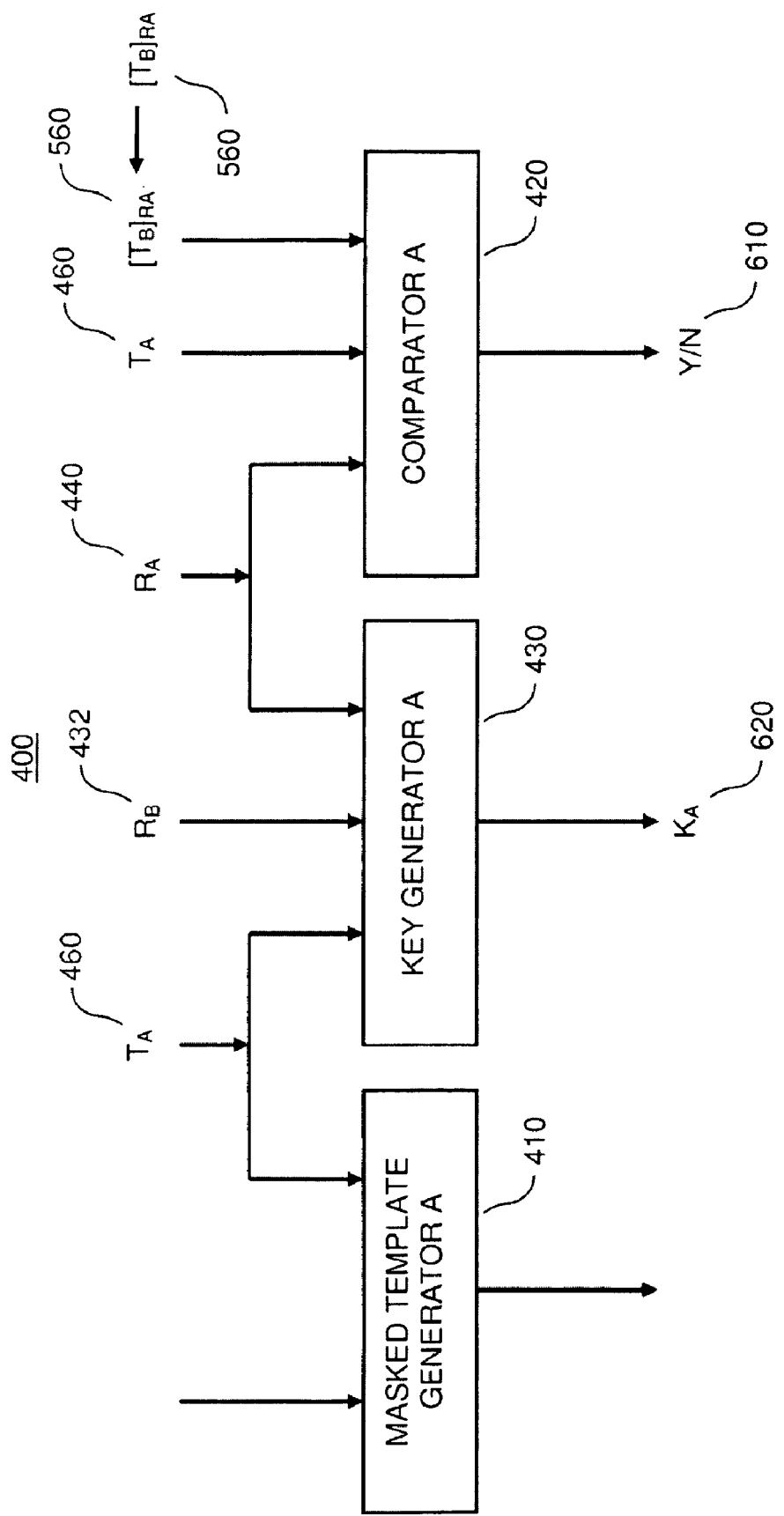
FIG. 6 illustrates a block diagram of a masked template generator, a comparator, and a key generator in a responding device in final processing steps for secure identity authentication according to an embodiment.

As shown in FIG. 6, Device A (depicted as 400) receives the randomized masked template $[T_B]_{RA}$ 560 from Device B. Comparator 420 of Device A processes its own raw template $T_A$ 460, its own random nonce $R_A$ 440, and the received masked template $[T_B]_{RA}$ 560 to produce a Yes/No decision 610 as described above with reference to FIG. 2. If the decision is a "No", Device A may choose to abort its synchronization operation with Device B, as the authentication operation has failed. Otherwise, as shown in FIG. 6, key generator 430 of Device A processes the received random nonce $R_B$ 432, its own random nonce $R_A$, 440, and its own raw template $T_A$ 460 to produce its key bits $K_A$ 620 as described above with reference to FIG. 3. The key bits $K_A$ 620 in FIG. 6 and $K_B$ 570 in FIG. 5 are to be identical when the decisions outputs 610 (FIG. 6) and 550 (FIG. 5) by comparators 420 and 520, respectively, are Yes.

If an attacker sends an earlier version of the masked template (e.g., generated with an earlier random nonce) then the comparator will reject it.

The second attack scenario is the common man-in-the-middle attack (MITM attack) associated with any attempt to derive a session key when both sides have no previous knowledge of each other. The session key is necessary so that a secure authenticated channel (SAC) can be established between the two devices to securely synchronize their data. The fact that the key generator (430, 530) is capable of outputting a set of matching bits (e.g., K as described above) that would be equally generated in both devices obviates this kind of MITM attack. These bits, $K_A$ 620 and $K_B$ 570, may be used as a session key or to derive such a session key for subsequent SAC establishment between Devices A and B. If $K_A$ 620 and $K_B$ 570 did not match on the two devices, then each device would have derived a different session key and the devices cannot communicate through the SAC. Because the MITM never obtained a raw template (which is a required input of the key generator), the MITM attack is mitigated.

Figure 7A:
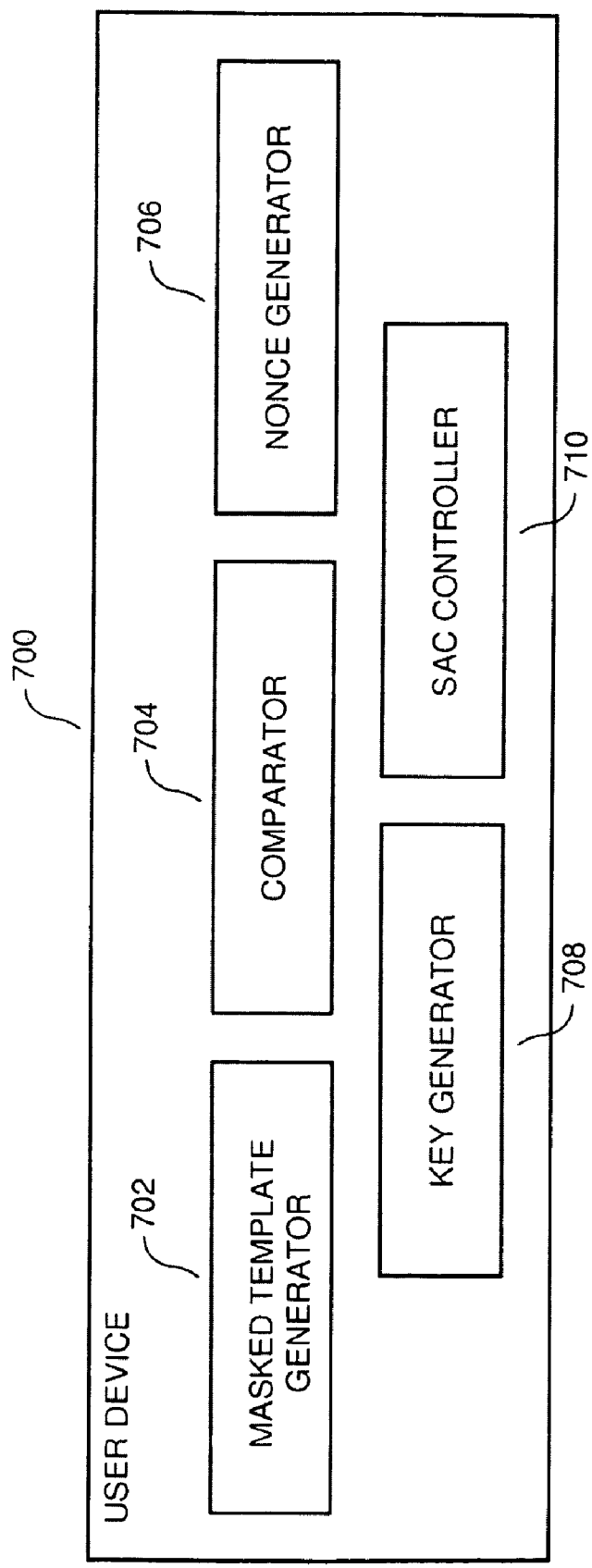
FIGS. 7A-B illustrates block diagrams of user electronics devices operable for secure identity authentication according to an embodiment.

FIG. 7A illustrates a high-level diagram of each user device, labeled as 700, that includes various components therein to implement secure identity authentication for data synchronization with other user devices, in accordance with one embodiment. The user device 700 includes a masked template generator 702, a comparator 704, a nonce generator 706, a key generator 708, and a secure authenticated channel (SAC) controller 710. The masked template generator 702 is comparable to the masked template generators 410 described in FIGS. 4 and 6 and 510 in FIG. 5. The comparator 704 is comparable to the comparators 420 in FIGS. 4 and 6 and 520 in FIG. 5. The nonce generator 706 may be a random number generator commonly used in many computer applications. It is operable to generate a random number for use to generate a masked template by the masked template generator 702 and, in some embodiments, a secondary masked template by the comparator 704. The generated random number may also be used in the key generator 708 to generate session keys. The key generator 708 is comparable to the key generators 430 in FIG. 6 and 530 in FIG. 5. Using keys generated by the key generator 708, the SAC controller 710 in FIG. 7A is operable to generate SACs between devices engaging in secure synchronization operations.

Figure 7B:
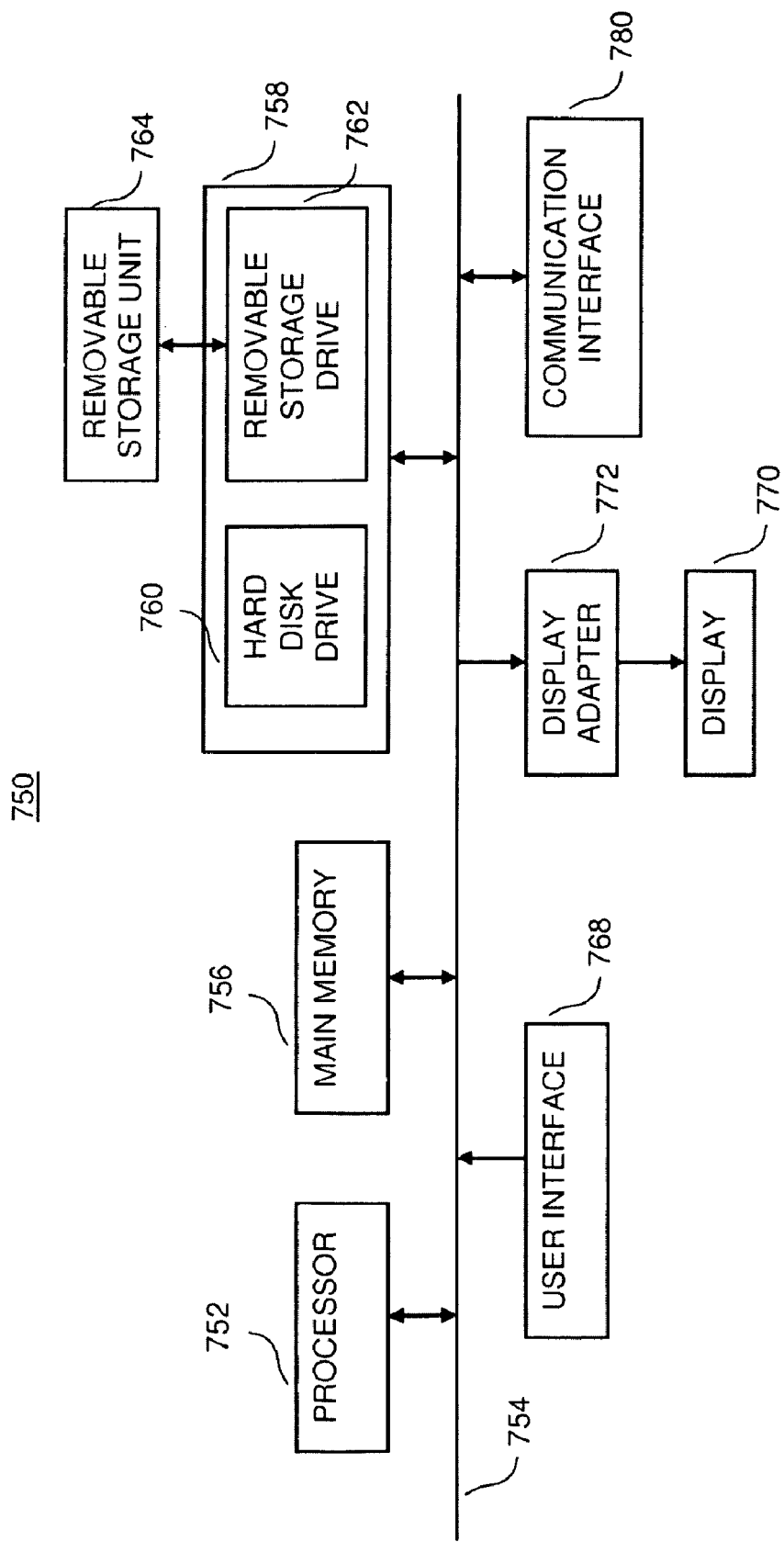

FIG. 7B illustrates a block diagram of a computerized system 750 that is operable to be used as a platform for a user device to implement the various device components 702-710 illustrated in FIG. 7A.

The computer system 750 includes one or more processors, such as processor 752, providing an execution platform for executing software. Thus, the computerized system 750 includes one or more single-core or multi-core processors of any of a number of computer processors, such as processors from Intel, AMD, and Cyrix. As referred herein, a computer processor may be a general-purpose processor, such as a central processing unit (CPU) or any other multi-purpose processor or microprocessor. A computer processor also may be a special-purpose processor, such as a graphics processing unit (GPU), an audio processor, a digital signal processor, or another processor dedicated for one or more processing purposes. Commands and data from the processor 752 are communicated over a communication bus 754 or through point-to-point links with other components in the computer system 750.

The computer system 750 also includes a main memory 756 where software is resident during runtime, and a secondary memory 758. The secondary memory 758 may also be a computer readable medium (CRM) that may be used to store software programs, applications, and/or modules to implement the functions of the components 702-710 in FIG. 7A. These software programs, applications, and/or modules include instructions that are executed or performed by the processor 752 to perform the functions of the components 702-710 in FIG. 7A. Thus, the CRM is operable to store software programs, applications, or modules that implement the methods 800-900 as described later. Examples of a CRM include a hard disk drive, a removable storage drive representing a floppy diskette drive, a magnetic drive, a compact disk drive, a flash drive (e.g., USB drive), and the like. Other examples of a CRM include ROM (read only memory), EPROM (erasable, programmable ROM), EEPROM (electrically erasable, programmable ROM), or any other electronic, optical, magnetic, or other storage or transmission device capable of storing electronic data and providing a processor or processing unit with computer-readable or electronic-type instructions.

The main memory 756 and secondary memory 758 (and an optional removable storage unit 764) each includes, for example, a CRM. The computer system 750 includes a display 770 connected via a display adapter 772, user interfaces comprising one or more input devices 768, such as a keyboard, a mouse, a stylus, and the like. However, the input devices 768 and the display 770 are optional. A communication interface 780 is provided for communicating with other user devices directly or via, for example, a network, and it is operable to enable the SAC controller 710 to establish a SAC with other user devices with a session key provided by the key generator 708. The communication interface 780 may be a wired interface, such as an Ethernet, firewire (IEEE 1394), or USB interface that is electrically coupled to various components shown in FIG. 7A to send and receive nonces and masked templates as described earlier and further described below with reference to FIGS. 8-9. Alternatively, the communication interface 780 may be a wireless interface, such as an infra-red (IR) or radio frequency (RF) interface, having a receiver for receiving, for example, nonces and masked templates generated by other user devices and a transmitter for transmitting nonces and masked templates generated by the user device as described earlier and further described below with reference to FIGS. 8-9. Thus, the communication interface is electrically coupled to the various components shown in FIG. 7A to receive and transmit nonces and masked templates. Furthermore, instead of using a separate receiver and transmitter, the communication interface 780 may use a transceiver to carry out the functions of both the receiver and transmitter.

Figure 8A:
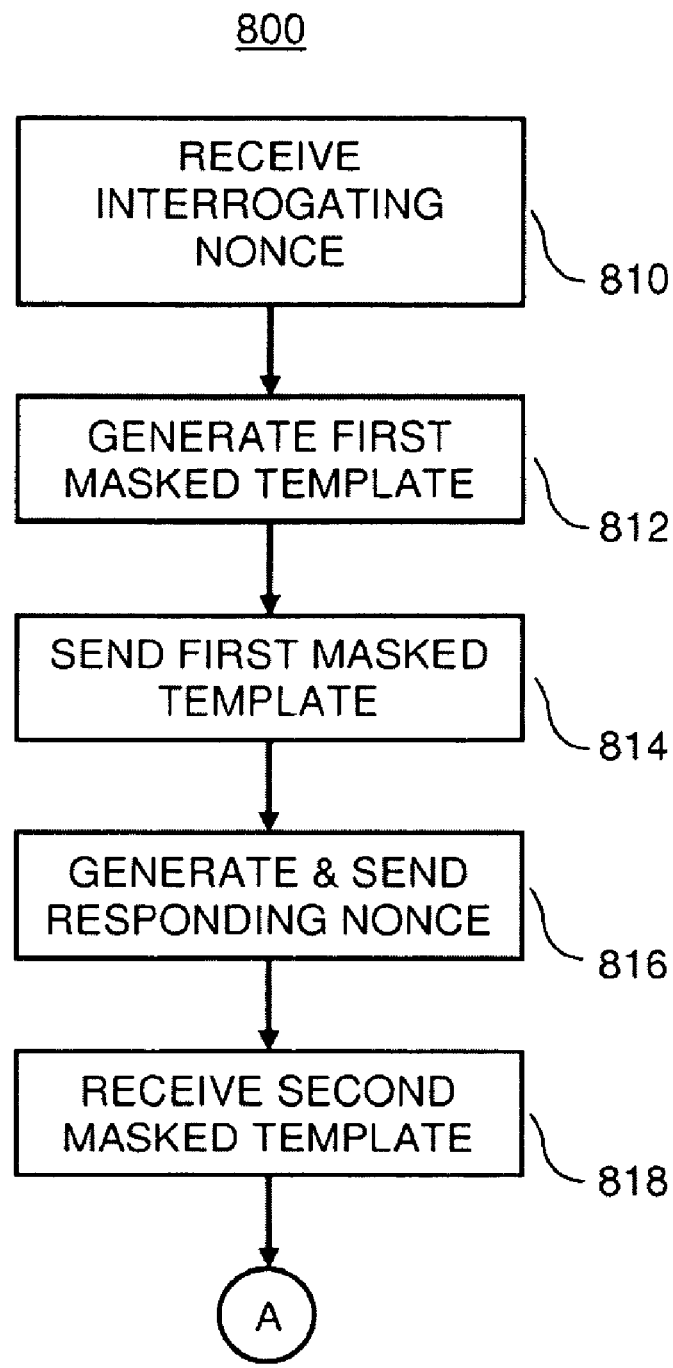
FIGS. 8A-B illustrate a process performed by a responding device for implementing secure identity authentication according to an embodiment.
Figure 8B:
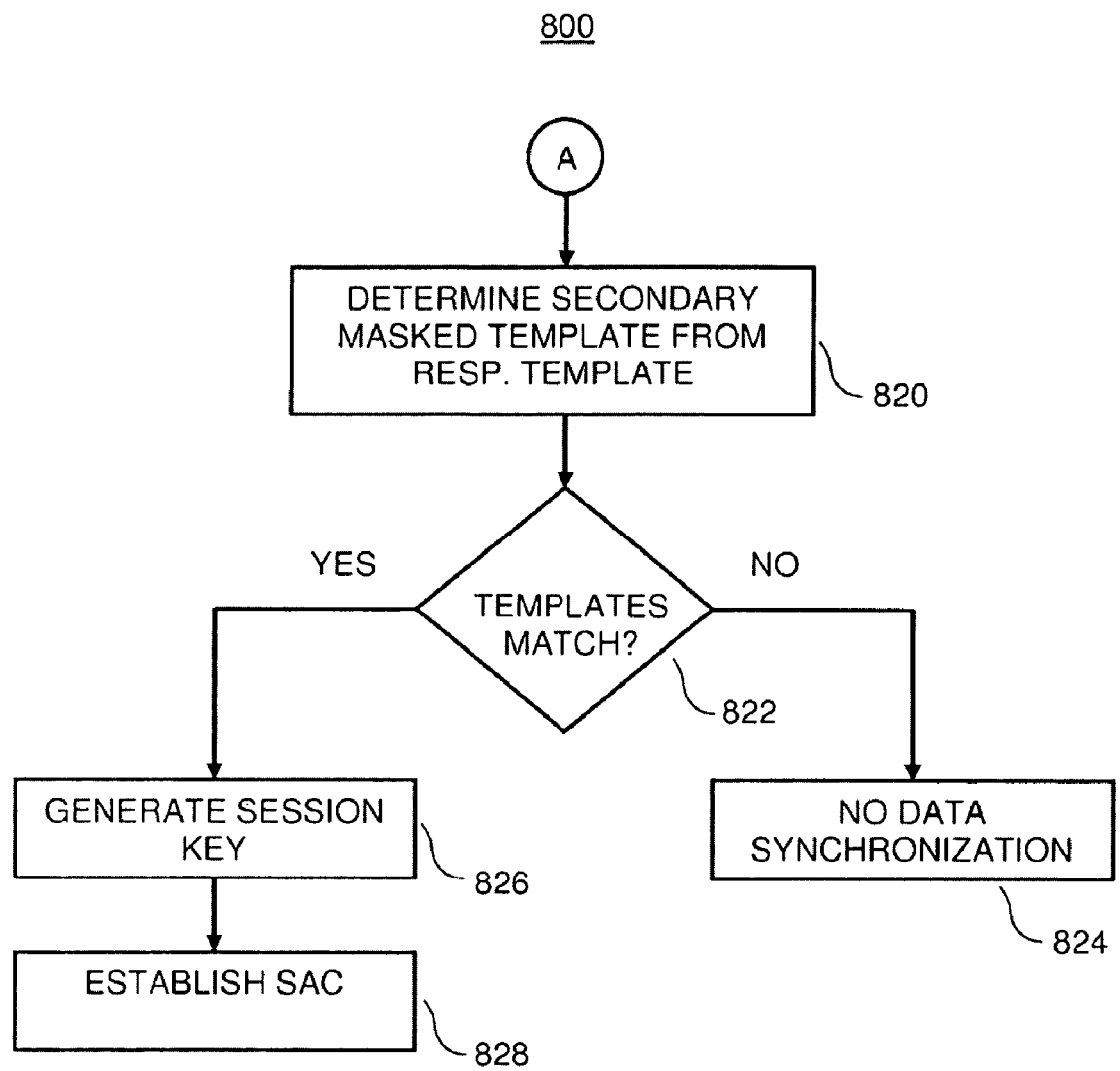
Figure 9A:
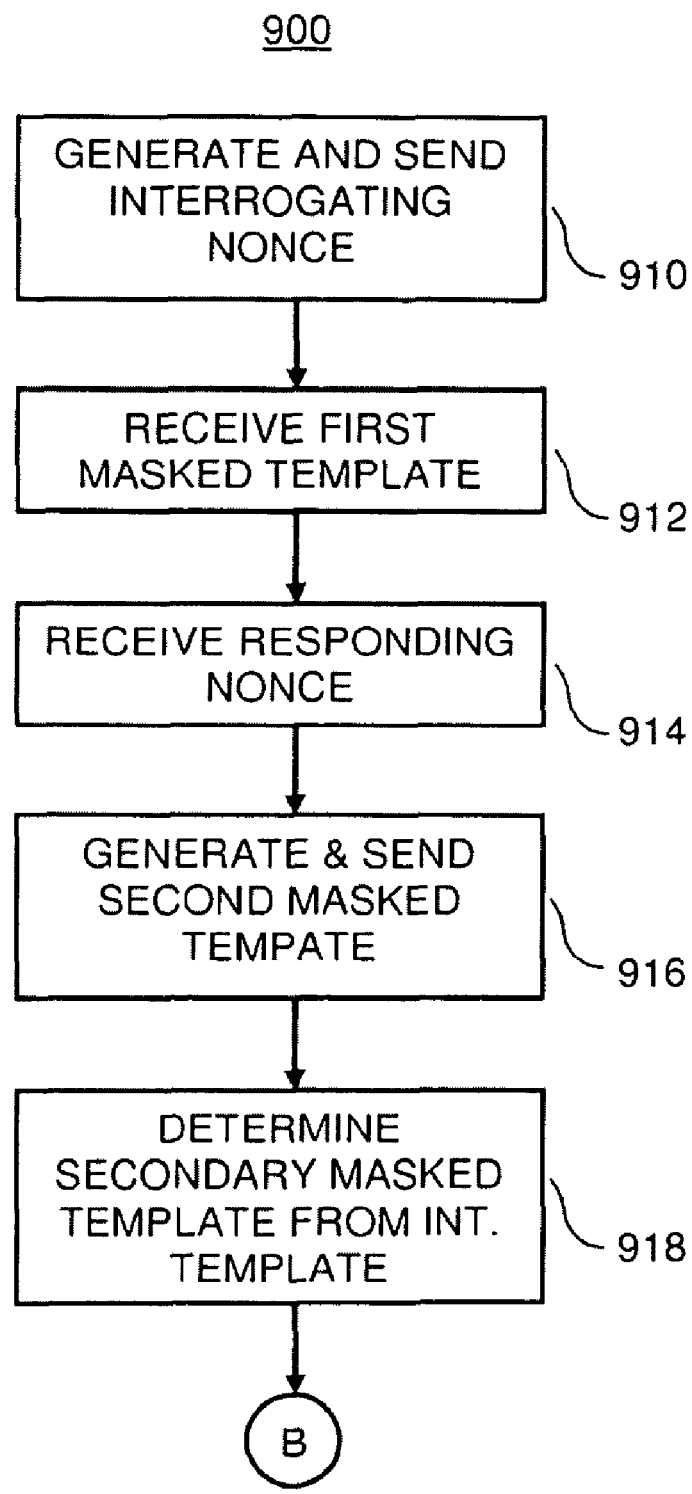
FIGS. 9A-B illustrate a process performed by an interrogating device for implementing secure identity authentication according to an embodiment.
Figure 9B:
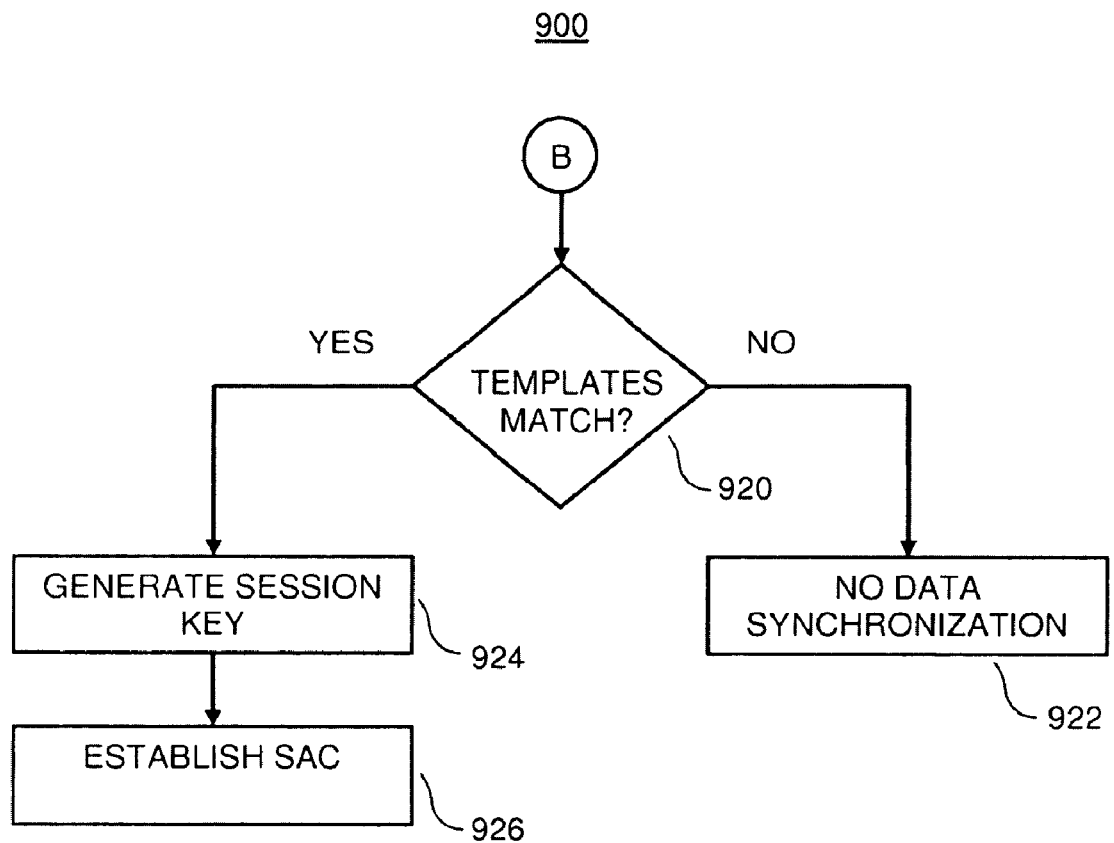

In operation, one device is an interrogating device that initiates data synchronization, and another device is a responding device that interacts with the interrogating device to establish a SAC for data synchronization. FIGS. 8A-B depict a process 800 performed by a responding device for implementing secure identity authentication to detect an authority of the interrogating device in order to perform data synchronization with the interrogating device, in accordance with one embodiment. Complementarily, FIGS. 9A-B depict a process 900 performed by the interrogating device for implementing secure identity authentication to detect an authority of the responding device to perform data synchronization with the responding device, in accordance with one embodiment. For illustrative purposes only and not to be limiting thereof, the processes 800 and 900 are discussed in the context of the user device illustrated in FIGS. 4-7. Also, for exemplary purposes only and not to be limiting thereof, the processes 800 and 900 are discussed with reference to the use of biometric templates as the identity information for identity authentication. Thus, it should be understood that such biometric templates may be replaced with other types of templates having information that may be used to identify the device and its user (or owner) without deviating from the scope of the present disclosure herein.

Referring first to FIGS. 8A-B with reference to the responding device, at 810, the masked template generator 410 (FIG. 4) of responding device (e.g., Device A in FIG. 4) receives an interrogating nonce $R_B$ (e.g., 432 in FIG. 4) from the interrogating device (e.g., Device B in FIG. 5). This interrogating nonce $R_B$ may be generated by a nonce generator 706 (FIG. 7A) in the interrogating device.

At 812, the masked template generator 410 of the responding device generates a first randomized masked template $[T_A]_{RB}$ (e.g., 450 in FIG. 4) of its raw biometric template $T_A$ (e.g., 460 in FIG. 4) based on the random nonce $R_B$ of the interrogating device.

At 814, the responding device sends the masked template $[T_A]_{RB}$ to the interrogating device.

At 816, the nonce generator 706 (FIG. 7A) in the responding device also generates and sends to the interrogating device a responding random nonce $R_A$ (e.g., 440 in FIG. 4).

At 818, the responding device further receives from the interrogating device a second randomized masked template $[T_B]_{RA}$ (e.g., 560 in FIG. 6) of a template $T_B$ (e.g., 540 in FIG. 5) of the interrogating device based on the random nonce $R_A$ of the responding device. This second randomized masked template $[T_B]_{RA}$ may be generated by the masked template generator 510 (FIG. 5) of the interrogating device.

Referring to FIG. 8B, at 820, the comparator 420 (FIG. 4), or the masked template generator 410 (FIG. 4), of the responding device determines a secondary masked template $[T_A]_{RA}$ of the template $T_A$ of the responding device based on the random nonce $R_A$ of the responding device.

At 822, The comparator 420 of the responding device compares the second randomized masked template $[T_B]_{RA}$ received from the interrogating device with the secondary masked template $[T_A]_{RA}$ generated by the comparator 420 (or the masked template generator 410) of the responding device to determine whether they match each other. A template match is declared when the randomized masked template $[T_B]_{RA}$ received from the interrogating device is close to the secondary masked template $[T_A]_{RA}$ by within a predetermined threshold.

At 824, if there is not a template match, this indicates that the responding and interrogating devices do not belong to the same user. Thus, the responding device will not allow data synchronization with the interrogating device.

At 826, however, if there is a template match, this indicates that the responding and interrogating devices belong to the same user. Accordingly, the key generator 430 of the responding device proceeds to generate key bits $K_A$ (e.g., using the key generator 620 in FIG. 6) for the responding device.

At 828, a SAC is established by a SAC controller, such as 710 shown in FIG. 7A, using the key bits $K_A$ derived in 826, for secure communication with the interrogating device.

Referring now to FIGS. 9A-B with reference to the interrogating device, at 910, the nonce generator 706 of the interrogating device generates and sends the random interrogating nonce $R_B$ (e.g., 432 in FIG. 5) to the responding device (as received at 810 in FIG. 8A).

At 912, the interrogating device receives from the responding device the first randomized masked template $[T_A]_{RB}$ (e.g., 450 in FIG. 5) of the template $T_A$ (e.g., 460 in FIG. 4) of the responding device based on the random interrogating nonce $R_B$ (as sent at 814 in FIG. 8A).

At 914, the masked template generator 510 of the interrogating device receives a responding nonce $R_A$ (e.g., 440 in FIG. 5) from the responding device (as sent at 816 in FIG. 8A);

At 916, the masked template generator 510 of the interrogating device generates a second randomized masked template $[T_B]_{RA}$ (e.g., 560 in FIG. 5) of its raw biometric template $T_B$ (e.g., 540 in FIG. 5) based on the random nonce $R_A$ of the responding device and sends it to the responding device (as received at 818 in FIG. 8A).

At 918, the comparator 520 (FIG. 5), or the masked template generator 510 (FIG. 5), of the interrogating device determines a secondary masked template $[T_B]_{RB}$ of the template $T_B$ of the interrogating device based on the random interrogating nonce $R_B$.

At 920 in FIG. 9B, the comparator 520 of the interrogating device compares the first randomized masked template $[T_A]_{RB}$ received from the responding device with the secondary masked template $[T_B]_{RB}$ generated by the comparator 520 (or the masked template generator 510) of the interrogating device to determine whether they match each other. A template match is declared when the randomized masked template $[T_B]_{RA}$ received from the interrogating device is close to the secondary masked template $[T_B]_{RB}$ by within a predetermined threshold.

At 922, if there is not a template match, this indicates that the responding and interrogating devices do not belong to the same user. Thus, the interrogating device will not allow data synchronization with the responding device.

At 924, however, if there is a template match, this indicates that the responding and interrogating devices belong to the same user. Accordingly, the key generator 530 of the interrogating device proceeds to generate key bits $K_B$ (e.g., 570 in FIG. 5) for the responding device. These key bits are the same as those generated by the key generator 430 of the responding device at 826 in FIG. 8B, because the raw templates match closely, as determined by the comparator 520.

At 926, a SAC is established by a SAC controller, such as 710 shown in FIG. 7A, using the key bits $K_B$ derived in 924, for secure communication with the responding device. This SAC is established between the responding device and the interrogating device using any of the standard methods utilizing a shared key. The shared key is the key derived from the key generation function, namely $K_A = K_B$. Consequently, the responding and interrogating devices may freely communicate with each other for data synchronization in a secure environment, namely, the SAC.

The transmission and reception of data or signals between the interrogating and responding devices may be achieved through their respective communication interface 780 (FIG. 7B) in any manner known in the art.

Accordingly, the systems and methods as described herein provide secure identity authentication in user devices by using identity information for device authentication and data synchronization, while keeping such identity information private to prevent forged device authentication for unauthorized data synchronization.

What has been described and illustrated herein are various embodiments along with some of their variations. The terms, descriptions and figures used herein are set forth by way of illustration only and are not meant as limitations. Those skilled in the art will recognize that many variations are possible within the spirit and scope of the subject matter, which is intended to be defined by the following claims, and their equivalents, in which all terms are meant in their broadest reasonable sense unless otherwise indicated.

What is claimed is:

1. A system for authenticating a user's identity across a plurality of user devices comprising:
   a first one of the plurality of user devices operating as an interrogating device that includes:
      a first nonce generator that operates to generate an interrogating nonce, wherein the interrogating nonce is a first unique number;
      a first communication interface that is electrically coupled to the first nonce generator to send out the interrogating nonce generated by the first nonce generator to a second one of the plurality of user devices operating as a responding device, and to receive, from the responding device, a first masked template of a first identity template of the responding device based on the interrogating nonce;
      a first comparator that is electrically coupled to the first communication interface and the first nonce generator to determine whether the first identity-related template matches a second identity-related template of the interrogating device using the received first masked template provided by the first communication interface, the second identity-related template of the interrogating device, and the interrogating nonce provided by the first nonce generator; and
      a first key generator that is electrically coupled to the first comparator to generate a key for secure communication upon receiving an indication from the first comparator that the second identity-related template of the interrogating device matches the first identity-related template.

2. A system for authenticating a user's identity across a plurality of user devices comprising:
   a first one of the plurality of user devices operating as an interrogating device that includes:

a first nonce generator that operates to generate an interrogating nonce, wherein the interrogating nonce is a first unique number;

a first communication interface that is electrically coupled to the first nonce generator to send out the interrogating nonce generated by the first nonce generator to a second one of the plurality of user devices operating as a responding device, and to receive, from the responding device, a first masked template of a first identity template of the responding device based on the interrogating nonce; and wherein the first communication interface also operates to receive a responding nonce from the responding device, wherein the responding nonce is a second unique number;

a first comparator that is electrically coupled to the first communication interface and the first nonce generator to determine whether the first identity-related template matches a second identity-related template of the interrogating device using the received first masked template provided by the first communication interface, the second identity-related template of the interrogating device, and the interrogating nonce provided by the first nonce generator, a first masked template generator that is electrically coupled to the communication interface to generate a second masked template of the second identity-related template of the interrogating device based on the responding nonce provided by the first communication interface, wherein the first communication interface further operates to send the second masked template based on the responding nonce to the responding device.

3. The system according to claim 2, wherein the first masked template generator generates the masked template using a first one-way function.

4. The system according to claim 3, wherein the first one-way function is a fuzzy extractor.

5. A system for authenticating a user's identity across a plurality of user devices comprising:

a first one of the plurality of user devices operating as an interrogating device that includes:

a first nonce generator that operates to generate an interrogating nonce, wherein the interrogating nonce is a first unique number;

a first communication interface that is electrically coupled to the first nonce generator to send out the interrogating nonce generated by the first nonce generator to a second one of the plurality of user devices operating as a responding device, and to receive, from the responding device, a first masked template of a first identity template of the responding device based on the interrogating nonce; and a first comparator that is electrically coupled to the first communication interface and the first nonce generator to determine whether the first identity-related template matches a second identity-related template of the interrogating device using the received first masked template provided by the first communication interface, the second identity-related template of the interrogating device, and the interrogating nonce provided by the first nonce generator;

wherein the second one of the plurality of user devices operating as the responding device includes:

a second communication interface that operates to receive the interrogating nonce from the interrogating device;

a second masked template generator that is electrically coupled to the second communication interface to generate the first masked template of the first identity-related template of the responding device based on the interrogating nonce obtained from the second communication interface; and the second communication interface also operates to send the first masked template based on the interrogating nonce to the interrogating device.

6. The system according to claim 5, wherein the second masked template generator generates the masked template using a second one-way function.

7. The system according to claim 6, wherein the second one-way function is a fuzzy extractor.

8. The system according to claim 6, wherein the responding device further comprises:

a second nonce generator that operates to generate a responding nonce;

the second communication interface is electrically coupled to the second nonce generator to send the responding nonce obtained from the second nonce generator to the interrogating device and to receive from the interrogating device a second masked template of the second identity-related template of the interrogating device based on the responding nonce; and a second comparator that is electrically coupled to the second communication interface and the second nonce generator to determine whether the second identity-related template of the interrogating device matches the first identity-related template of the responding device using the received second masked template provided by the second communication interface, the first identity-related template of the responding device, and the responding nonce provided by the second nonce generator.

9. The system according to claim 8, wherein the responding device further comprises:

a second key generator that is electrically coupled to the second comparator to generate a key for secure communication upon receiving an indication from the second comparator that the second identity-related template of the interrogating device matches the first identity-related template of the responding device.

10. A system for authenticating a user's identity across a plurality of user devices comprising:

a first one of the plurality of user devices operating as an interrogating device that includes:

a first nonce generator that operates to generate an interrogating nonce, wherein the interrogating nonce is a first unique number;

a first communication interface that is electrically coupled to the first nonce generator to send out the interrogating nonce generated by the first nonce generator to a second one of the plurality of user devices operating as a responding device, and to receive a first masked template of a first identity template of the responding device based on the interrogating nonce;

a first comparator that is electrically coupled to the first communication interface and the first nonce generator to determine whether the first identity-related template matches a second identity-related template of the interrogating device using the received first masked template provided by the first communication interface, the second identity-related template of the interrogating device, and the interrogating nonce provided by the first nonce generator;

a first key generator that is electrically coupled to the first comparator to generate a key for secure communication upon receiving an indication from the first comparator that the second identity-related template of the interrogating device matches the first identity-related template;

the first communication interface also operates to receive, from the responding device, a responding nonce;

a first masked template generator that is electrically coupled to the communication interface to generate a second masked template of the second identity-related template of the interrogating device based on the responding nonce provided by the first communication interface; and the first communication interface further operates to send the second masked template based on the responding nonce to the responding device;

the second one of the plurality of user devices operating as the responding device that includes:

a second communication interface that operates to receive the interrogating nonce from the interrogating device;

a second masked template generator that is electrically coupled to the second communication interface to generate the first masked template of the first identity-related template of the responding device based on the interrogating nonce obtained from the second communication interface;

the second communication interface also operates to send the first masked template based on the interrogating nonce to the interrogating device;

a second nonce generator that operates to generate a responding nonce;

the second communication interface is electrically coupled to the second nonce generator to send the responding nonce obtained from the second nonce generator to the interrogating device and to receive from the interrogating device a second masked template of the second identity-related template of the interrogating device based on the responding nonce;

a second comparator that is electrically coupled to the second communication interface and the second nonce generator to determine whether the second identity-related template of the interrogating device matches the first identity-related template of the responding device using the received second masked template provided by the second communication interface, the first identity-related template of the responding device, and the responding nonce provided by the second nonce generator; and a second key generator that is electrically coupled to the second comparator to generate a key for secure communication upon receiving an indication from the second comparator that the second identity-related template of the interrogating device matches the first identity-related template of the responding device.

* * * * *